April 28, 1959

B. SACKS 2,883,836

SYSTEM FOR UTILIZING HEAT REMOVED
FROM A REFRIGERATED SPACE

Filed June 28, 1956

Inventor
Bernard Sacks
by Arthur N. Klein
Attorney

# United States Patent Office 2,883,836
Patented Apr. 28, 1959

2,883,836

SYSTEM FOR UTILIZING HEAT REMOVED FROM A REFRIGERATED SPACE

Bernard Sacks, Larchmont, Pa.

Application June 28, 1956, Serial No. 594,451

3 Claims. (Cl. 62—196)

The present invention relates generally to heat transfer systems and more particularly to a system for utilizing the heat removed from a refrigerated space.

In large food markets and the like selling frozen foods, a large number of refrigerated storage and display chests are required to keep the food at below freezing temperature. The mechanical refrigeration units for these chests include compressors which are usually water-cooled; the cooling water being pumped through a cooling tower (usually located on the roof of the building) to dissipate the heat picked up from the water-jacketed compressors, after which the re-cooled water is circulated back to the water-jackets of the compressors. Thus, the heat removed from the refrigerated chests accomplishes no useful purpose. Additionally, water-cooled refrigeration systems, while more efficient than air-cooled systems, result in undesirable build up of salts in the cooling water due to normal evaporation in the water tower and this, plus the growth of algae and the like in the tower during water circulation therethrough makes for rather high maintenance costs.

Similar problems are encountered in food freezer plants which employ large water-cooled refrigeration systems for the freezing rooms.

Accordingly, it is an object of the present invention to provide a new and useful heat transfer system which will enable the heat removed from such refrigerated chests or rooms or the like to be utilized efficiently in the building heating system (thereby eliminating or substantially reducing normal fuel bills) and which, at the same time, reduces maintenance costs by greatly cutting down the time during which the cooling water has to be passed through the cooling tower in cold weather. Other objects and advantages of the present invention are apparent in the following detailed description, appended claims and accompanying drawings.

For the purpose of illustrating the invention, one form thereof, which is presently preferred, is shown in the accompanying drawings; it being understood, however, that this invention is not limited to the precise arrangements and instrumentalities illustrated.

Referring to the drawings, in which like reference characters indicate like parts throughout:

Figure 1:
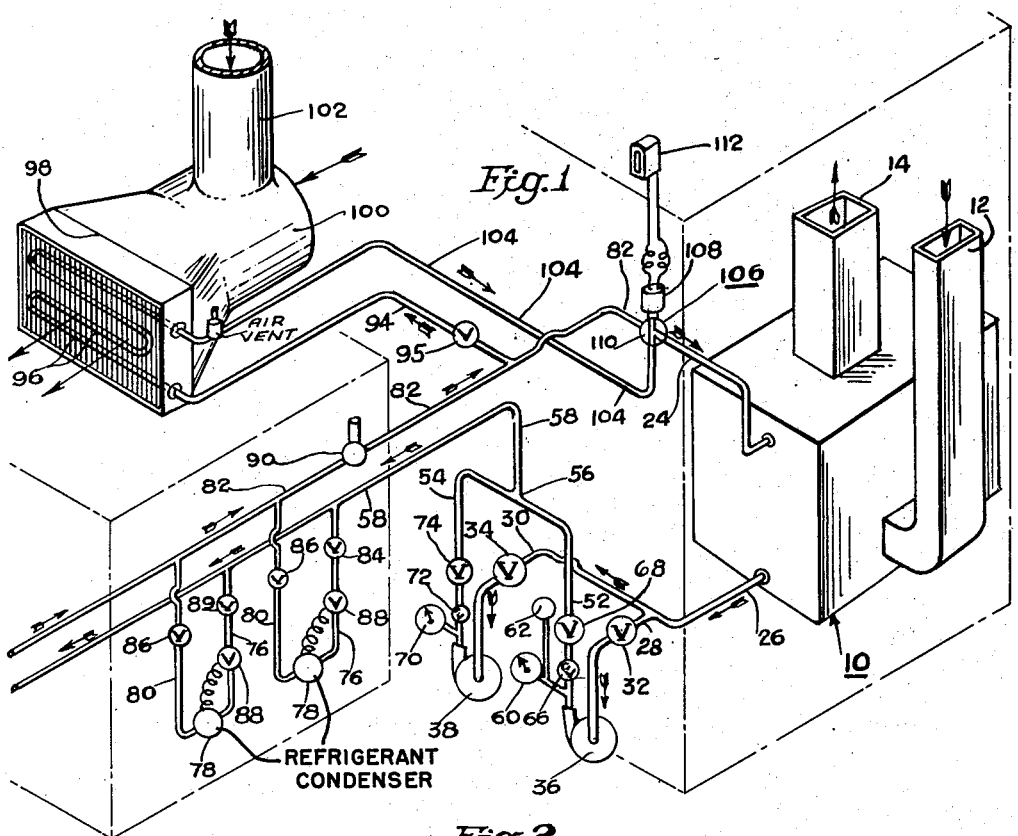
Figure 1 is a schematic perspective view of a heat transfer system embodying the present invention.
Figure 2:
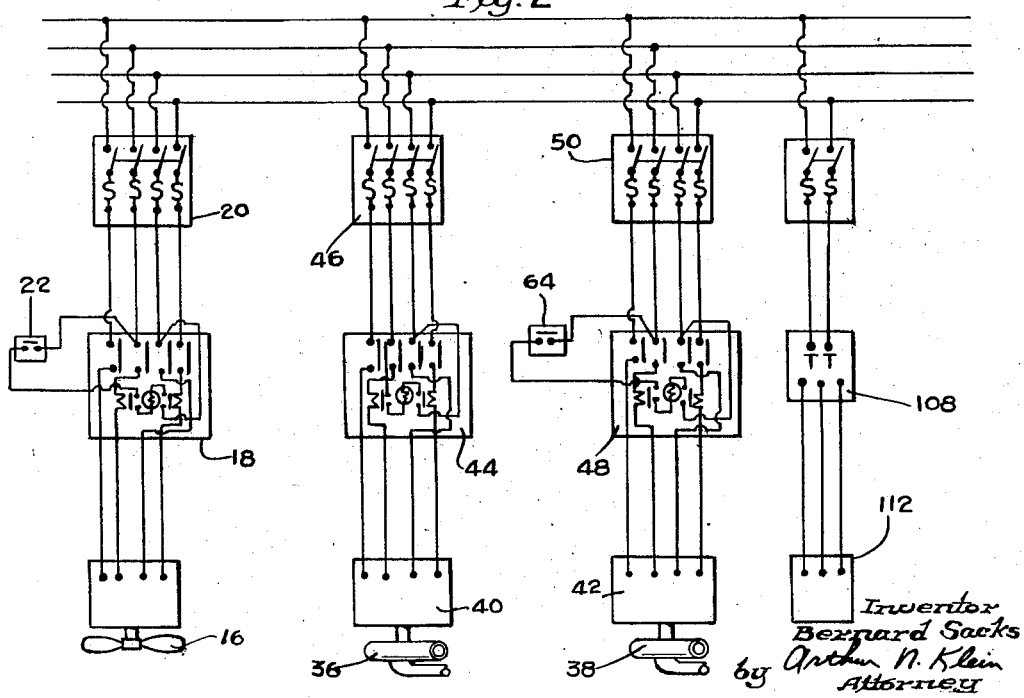
Figure 2 is a wiring diagram of a two-phase electrical system employed in the embodiment of Fig. 1.

In Fig. 1 there is shown a conventional tower 10 for cooling the water of a mechanical water-cooled refrigeration system. The tower is provided with an air intake duct 12 and an air exhaust duct 14; the air being circulated by a fan disposed within the tower housing in conventional manner. The tower 10 is ringed by a dotted line to indicate that it is located outside the remainder of the system. The tower fan is not shown in Fig. 1, but is illustrated schematically at 16 in the wiring diagram of Fig. 2. As also shown in Fig. 2, the tower fan 16 is provided with a conventional magnetic starter 18 and a safety switch 20, appropriately wired into a two-phase electrical system.

The starter is connected to a thermostat micro-switch 22, to be more fully described hereinbelow, which opens and closes the control circuit of the starter to stop and start the tower fan 16 responsive to variations in the temperature of the cooling water.

The tower 10 is provided with a hot water intake line 24 and a cold water outlet line 26. The outlet line 26 leads to parallel branch lines 28 and 30, provided with valves 32 and 34, leading to pumps 36 and 38 respectively. Pump 36 is the primary water circulating pump, while pump 38 is the standby pump which takes over in case of failure of the pump 36. Pumps 36 and 38 are driven by motors 40 and 42 respectively, shown in Fig. 2. Motor 40 is provided with a conventional magnetic starter 44 and safety switch 46, while motor 42 is provided with magnetic starter 48 and safety switch 50.

The delivery lines 52 and 54 from the pumps 36 and 38 respectively come together at 56 at which point they communicate with the main cold water delivery line 58.

The delivery line 52 from the pump 36 is provided with a pressure gage 60 to indicate the water pressure in the line and is also provided with a conventional control switch mechanism 62 which is sensitive to, and actuated by, the water pressure in the line 52, as for example a Bourdon tube mechanism, and which is set to close a normally-open switch 64 upon drop in water pressure.

The switch 64 is connected into the control circuit of the starter 48, as shown in Fig. 2, so that, upon failure of the pump 36, the drop in pressure in line 52 will automatically close the switch 64, energize the starter 48 and start up the standby motor 42 and pump 38 to take over the pumping load.

The delivery line 52 is also provided with a check valve 66 to prevent backing up of water when pump 38 is operating, as well as a manually operated control valve 68.

The delivery line 54 is provided with a pressure gage 70, a check valve 72 and a manually operated control valve 74, like those in the line 52.

The main cold water delivery line 58 connects with a plurality of branch lines 76, each of which leads to the condenser 78 of a refrigerator compressor system operatively connected to a freezer chest or room in conventional manner with such freezer chest or room being indicated diagrammatically by the dash-dot line in Figure 1, the remainder of Figure 1 comprising the enclosed space which forms the supermarket or room within which the freezer chest or freezer room is located. From the condenser 78, a branch line 80 leads back to the main hot water return line 82. While two condensers 78, each with lines 76 and 80, are shown, it is obvious that any number could be connected in parallel intermediate the main lines 58 and 82, in like manner.

The branch lines 76 and 80 are provided with valves 84 and 86 respectively. The line 76 is also provided with an automatic water regulating valve 88, operatively connected to the condenser in conventional manner so as to increase the rate of flow when temperature in the condenser 78 rises and to reduce the rate of flow of cooling water when the temperature in the condenser falls.

Obviously, the longer any one compressor continues running, the longer cooling water will continue to circulate through the branch lines 76 and 80 and the condenser 78 (which serves to cool the vaporized refrigerant, such as Freon, which had previously been compressed and liquefied by the compressor and then allowed to expand suddenly and vaporize, in a manner which is well known in the art). On the other hand, when a compressor stops running, the drop in condenser temperature will automatically cause closing of the water regulating valve 88, so that the cold water from the main line 58 will bypass that particular pair of branch lines 76 and 80 and condenser 78, while continuing to circulate through and cool the remaining condensers of the still-running refrigerant compressors.

At a point inward of the first branch line 80 (that is, between the first branch line 80 and the water tower 10), the main hot water return line 82 is provided with a conventional immersion type thermostatic control element 90, which can be set for any desired temperature of hot water in the return line 82, as for example 95° F., and which automatically opens and closes the thermostat micro-switch 22 mentioned above, so as to stop and start the tower fan motor. Thus, the tower fan runs only when and if the temperature of the hot water in the main return line 82 exceeds the pre-set figure. As long as the hot water temperature in the main return line keeps below the pre-set figure, the tower fan remains shut off and the water simply circulates from the line 82 through the tower 10 without any cooling (and attendant evaporation) within the tower and back to the main cold water delivery line 58.

During winter operation of the freezer chests or rooms, the heat in the hot water passing through the main return line 82 can be put to practical use by employing it to warm a larger enclosed space, as for example a store or supermarket or the remainder of a freezing plant.

To this end, a branch line 94, having a manual shut-off valve 95, leads from the main hot water return line 82 to heat transfer coils 96 mounted as at 98 within an air duct 100. The duct 100 recirculates air from the space being warmed and is provided with a fresh-air-intake 102 for mixing fresh air with the re-circulated air in conventional manner. It is obvious that, as the air passes across the coils 96 on its way to the space being warmed, the air picks up heat from the coils 96 which are correspondingly cooled, extracting heat from the hot water circulating through the coils.

From the other end of the coils 96, a water line 104, provided with an air vent 107, leads back to the main hot water return line 82. A 3-way valve 106, having an operating motor 108, is provided with connections to the main hot water return line 82, the branch return line 104, and the hot water intake line 24 running to the tower 10. The valve 106 has a cock 110, which is rotated by the motor 108 in conventional manner, and which is provided with two intercommunicating bores, so that, in the position shown in Fig. 1, the bores connect the lines 104 and 24 (while closing off the line 82) while in a 90-degree counterclockwise rotated position of the cock 110 the bores connect the lines 82 and 24 (while closing off the line 104). It is obvious that, when the valve cock is in the Fig. 1 position, the hot return water must pass through the coils 96 to warm the air and the space, whereas in the 90-degree counterclockwise rotated position the bores connect the lines 82 and 24 (while closing off the line 104) so that the hot water bypasses the coils 96 and returns directly to the tower 10.

As indicated in Fig. 2, the valve motor 108 is operatively connected to, and controlled by, a conventional adjustable thermostatic control element 112, located in the store or other space being warmed.

The element is set for any desired room temperature to be maintained, such as 72° F. Whenever the space temperature falls below the set figure, the element 112 starts the valve motor 108 and rotates the cock 110 to the Fig. 1 position, so that the air passing through the duct 100 is warmed by the hot water circulating through the coils 96; the air in the duct 100 being moved by a blower (not shown) of conventional construction. When the space temperature has risen above the set figure, the control element 112 operates to cause opposite rotation of the motor 108, so that the valve cock 110 is rotated 90 degrees counterclockwise from the Fig. 1 position, whereupon the hot water in the return line 82 bypasses the coils 96 so that there is no further heating of the air moving through the duct 100.

It has been found that, in temperate climates, the heat recovered from the freezer chests in the usual supermarket is sufficient to supply all the heating needs of the store so that the main heating furnace never goes on, although it may be desirable to connect such a conventional heating furnace (not shown) within the duct 100, in usual manner for use when the outside temperature becomes unusually low (for example below 32° F.) so that the coils 96 alone cannot supply sufficient heat to maintain the pre-set space temperature. Where such a conventional heating furnace is used, it is controlled, in conventional manner, so that it does not start up unless and until the coils 96 prove incapable of supplying all the heat required or unless there is a failure or shut down of the refrigerating compressors.

Of course, when the outside temperature does become unusually low so that the regular hot air furnace starts up, the heat transfer coils 96 still continue to supply heat to the air passing through the air duct 100 so that the furnace consumes less fuel than would otherwise be required.

It can be seen, therefore, that the present invention effects very substantial savings in heating costs. Indeed, the saving in heating costs is usually sufficient to pay for the cost of installation in a single heating season.

By rotating the valve cock 110 one hundred and eighty degrees from the position shown in Fig. 1, the main hot water return line 82 can be connected to the line 104 from the heat transfer coils 96, while closing off the intake line 24 to the tower 10. This bypasses the tower 10 and enables it to be disconnected for repair or maintenance.

However, I prefer to have the hot water circulate through the tower 10 during normal operation (with the valve cock 110 disposed either in the position shown in Fig. 1 or in the 90 degree counterclockwise-rotated position described above) whether or not the hot water is sent through the heat transfer coils 96 since, in this way, the tower 10 provides a safety factor in preventing any possible overheating of the cooling water.

Since the greater part of the heat is removed from the hot water passing through the coils 96 before the hot water reaches the tower 10, the latter does not normally perform any cooling function (tower fan being shut off when the hot water temperature is below the predetermined figure as described above) and, therefore, there is no undesirable build-up of salt concentration such as normally causes excessively high maintenance costs.

The present invention may be embodied in other specific forms and, therefore, the above described embodiment is to be considered in all respects merely as illustrative and not restrictive; reference being made to the appended claims as indicating the scope of this invention.

Having thus described my invention, I claim as new and desire to protect by Letters Patent the following:

1. For use in connection with the refrigerant condenser of a compression-expansion type refrigerating system which refrigerating system is used for cooling an enclosed air space; a heating system for a second enclosed air space requiring heating, said heating system comprising water cooling mechanism located outside the second space, said outside cooling mechanism having a cold water delivery line leading to said condenser and also having a hot water intake line; a hot water return line leading from the condenser back to the hot water intake line, a water circulating pump operatively connected within one of said water lines, thermostatic control means connected within the hot water return line and operatively connected to the outside cooling mechanism for actuating the cooling mechanism only when the temperature of the hot water in the return line exceeds a predetermined figure; a heat transfer coil located within said heating system; a branch water line leading from the above-mentioned hot water return line to said heat transfer coil; a water line leading back from said heat transfer coil to the above mentioned hot water intake line; automatic valve means operatively connected at the junctures of the hot water return line and the heat transfer coil return line with the hot water intake line; and thermostatic control means located within the second space and operatively connected to the automatic valve, said thermostatic control means being constructed and arranged to close off the connection between the hot water return line and the hot water intake line while opening the connection between the heat transfer coil return line and the hot water intake line so as to send hot water through the heat transfer coils when the temperature in the second space drops below a predetermined figure or alternatively to close off the connection between the heat transfer coil return line and the hot water intake line while opening the connection between the hot water return line and the hot water intake line so as to bypass the heat transfer coil when the temperature in the second space rises above the predetermined figure.

2. A construction according to claim 1 wherein the automatic valve means comprises a motor-operated 3-way valve having connections to the hot water return line, the hot water intake line and the heat transfer coil return line, and having an apertured rotatable cock capable of being turned to two separate positions whereby the hot water intake line is connected selectively to either the hot water return line or the heat transfer coil return line.

3. A construction according to claim 1 wherein the water circulating pump is operatively connected within the cold water delivery line, and wherein a standby pump is connected in parallel with the above mentioned pump, and wherein means are provided for automatically starting the standby pump immediately upon failure of the main circulating pump, said last mentioned means including mechanism operatively connected to the outlet side of the main circulating pump and sensitive to any pressure drop therein and electrical switch mechanism actuated by pressure sensitive mechanism for starting the standby pump upon drop in pressure at the delivery end of the main pump.

References Cited in the file of this patent
UNITED STATES PATENTS

| | | |
|---|---|---|
| 1,874,803 | Reed | Aug. 30, 1932 |
| 2,210,325 | Newton | Aug. 6, 1940 |
| 2,233,633 | Mollenberg | Mar. 4, 1941 |
| 2,247,056 | Howard | June 24, 1941 |
| 2,665,637 | Lauck | Jan. 12, 1954 |
| 2,726,067 | Wetherbee et al. | Dec. 6, 1955 |
| 2,750,764 | Lynch | June 19, 1956 |
| 2,764,876 | Parcaro | Oct. 2, 1956 |
| 2,796,743 | McFarlan | June 25, 1957 |
| 2,797,068 | McFarlan | June 25, 1957 |